(12) United States Patent
Bingeman et al.

(10) Patent No.: US 6,446,005 B1
(45) Date of Patent: Sep. 3, 2002

(54) MAGNETIC WHEEL SENSOR FOR VEHICLE NAVIGATION SYSTEM

(75) Inventors: Kirk Bingeman; Richard Velasquez, both of Phoenix; William Tekniepe, Mesa, all of AZ (US)

(73) Assignee: Prolink, Inc., Chandler, AZ (US)

( * ) Notice: Subject to any disclaimer, the term of this patent is extended or adjusted under 35 U.S.C. 154(b) by 0 days.

(21) Appl. No.: 09/373,556

(22) Filed: Aug. 13, 1999

(51) Int. Cl.$^7$ ................................................ B62D 1/28
(52) U.S. Cl. ....................... 701/215; 701/216; 701/217; 701/213; 342/357; 342/106; 342/107; 342/137; 342/457; 180/167; 180/168
(58) Field of Search ................................. 701/215, 216, 701/217, 213, 214; 180/168, 167; 377/24.1; 342/357, 357.14, 107, 106, 108, 457, 451, 463; 473/407, 409, 137, 169

(56) References Cited

U.S. PATENT DOCUMENTS

| | | | | |
|---|---|---|---|---|
| 4,109,186 A | * | 8/1978 | Farque | 318/587 |
| 4,480,310 A | * | 10/1984 | Alvarez | 364/450 |
| 4,887,281 A | * | 12/1989 | Swanson | 377/24.1 |
| 5,600,113 A | * | 2/1997 | Ewers | 235/95 R |
| 5,878,369 A | * | 3/1999 | Rudow et al. | 701/215 |
| 5,938,704 A | * | 8/1999 | Torii | 701/23 |
| 5,944,132 A | * | 8/1999 | Davies et al. | 180/168 |
| 6,024,655 A | * | 2/2000 | Coffee | 473/407 |

* cited by examiner

Primary Examiner—William A. Cuchlinski, Jr.
Assistant Examiner—Tuan C To
(74) Attorney, Agent, or Firm—Blank Rome Comisky & McCauley LLP (57) ABSTRACT

A system is disclosed for determining precise locations of the golf carts on a golf course in real time as the carts are in use during play of the course. Each cart is outfitted with a dead reckoning navigation (DRN) system for determining speed and direction, and a compass for determining heading of the cart during play. With these parameters and a known origin of the cart to which the DRN system has been calibrated, such as location of a tee box, the location of the cart relative to a known feature of the course such as a cup or hazard may be calculated. The DRN system uses a magnetic wheel sensor assembly having a magnetic strip with spaced alternating opposite magnetic poles affixed to the rim of an inside wheel well or mounting fixture therefor of the cart, mounted to confront a Hall effect sensor. During rotation of the wheel and the strip when the cart is moving, the sensor detects passage of the alternating poles, to measure speed and forward or backward direction of the cart. A compass determines heading of the cart. The DRN system allows operation on courses where GPS-based systems cannot maintain LOS, and is periodically calibrated by a known signal, such as a DGPS signal.

16 Claims, 6 Drawing Sheets

MAGNETIC WHEEL SENSOR FOR VEHICLE NAVIGATION SYSTEM

BACKGROUND OF THE INVENTION

The present invention relates generally to improved position, distance measuring, navigation, and information systems for use on golf courses, and more particularly to improved components for a golf navigation system utilizing dead reckoning.

In golf, players are more comfortable and more likely to excel on courses with which they are familiar. It is customary for a golfer on a new or little-played course to seek to gain at least some familiarity with the layout of each hole before starting play. Armed with this information, the golfer can approach each tee box during play of the course, knowing, for example, whether the particular hole is a 'dog leg left', a 'dog leg right', or straight; the general locations of hazards, such as sand traps, bunkers, and water traps on the hole; and locations of range postings, if any, for calculating yardage from the golfer's location to the front and rear of the green, the pin (cup), a hazard, and a desired lay up position for the green approach shot.

Golf courses have traditionally made available course layout and feature information booklets in the pro shop, for just such purposes. Yardage markers typically are placed at sprinkler heads along each hole, to provide range information from that point to the center of the green. These serve as aids to the player, but they also contribute to slowing the pace of play of the course. Slow play has an adverse effect on the courses daily revenue, as well as on other golfers' enjoyment of the game.

Proposals made to improve golf course information systems include use of buried electrical wires in various layouts on the course for interaction with mobile overland components (e.g., U.S. Pat. No. (USPN) 5,044,634 ("the '634 patent"); and use of radio direction finding or triangulation techniques (e.g., USPN 4,703,444 ("he '444 patent") and USPN 5,056,106).

More than twenty years ago, the U.S. government established a Global Positioning System (GPS) that uses space satellites and ground based stations to determine distance, range, and position, primarily for defense purposes, but which has found many uses for such information in various industrial and commercial applications. Earth-orbiting satellites provide reference points from which to determine the position of a point on or near the earth, using ground-based receivers. The satellite orbits are monitored by the ground station GPS receivers, and the travel times of signals received from the satellites are used to measure distance to each satellite. Each signal from a satellite is coded to permit the receiver to determine the elapsed time between transmission of the signal from the respective satellite and reception at the GPS receiver antenna, and thereby to calculate the distance as the product of elapsed time and speed of light. Receivers are not restricted to large ground stations, but may be portable, mobile and hand-held units for a multitude of private navigation, position and distance-measuring systems.

Distance measurements to three GPS satellites are used to accurately define the position of an object such as a GPS receiver, which may be stationary or moving, on or near the earth's surface. A fourth satellite enables verification of clock timing in the GPS system. With several satellites in "view" (i.e., line-of-sight, or LOS), and using a computer, distances between objects can theoretically be measured almost instantaneously with great accuracy. But as a practical matter even small errors that typically occur in the calculated measurement of satellite signal travel time from system and natural phenomena can substantially reduce the accuracy of the distance and position calculations. Error causing phenomena include atmospheric propagation, receiver contributions, satellite ephemeris, and satellite clock. Errors have been purposely introduced in the satellite signals by the government to deny civilian users full accuracy. The combined effect of these errors can be as high as 100 meters or so.

In co-pending patent application Ser. Nos. 08/423,295 (now U.S. Pat. No. 5,689,431) and 08/525,905, filed Apr. 18, 1995 and Sep. 8, 1995, respectively, assigned to the same assignee as the present application ("The '295 and '905 applications"), improvements are disclosed in golf course positioning and yardage measuring systems utilizing differential GPS (DGPS) (see, for example, Blackwell, "Overview of Differential GPS Methods", *Global Positioning System*, vol. 3, pp. 89–100, The Institute of Navigation, Washington, D.C. (1986)). With DGPS, errors in distance measuring applications are reduced by broadcasting error correction information from a ground receiver of known location in the vicinity of the user. The difference between a known fixed position of a GPS receiver and its position calculated from the satellite GPS signal fixes the error in the signal, and a continuous correction is provided for all other receivers, fixed or mobile, in the reception area. Knowing the error allows all distance and position calculations at the user's receiver to be corrected.

The golf course positioning and yardage measuring systems of the '295 and '905 applications use unique filtering algorithms, among other things, to offer much greater accuracy and reliability than are found with conventional DGPS systems. An efficient, yet inexpensive communications network is used for data transmission between a base station and golf carts, with a variable length communication network that allows golf carts to be readily added or removed from the network. Other advantages include detecting when the golf cart is within predetermined zones or regions of the course for use in unique features such as automatic display of the current hole on the cart monitor, measuring the pace of play for each hole, and providing automatic pop-up golf tips and advertisements on the cart monitor as the cart transitions from one hole to the next. The monitor is mounted in the roof of the cart in a way that gives the user excellent color readability in sunlight.

The PROLINK™ yardage and course management system disclosed in the '295 and '905 applications (PROLINK is a trademark of PROLINK, INC. of Chandler, Ariz., the assignee of the invention disclosed herein and in the '295 and '905 applications) includes a golf cart-based subsystem (or, alternatively, a hand-held or other roving unit) that uses state-of-the-art DGPS technology, coupled with specialized hardware and software. The system creates, stores, and displays a color graphical representation or map of the golf course on a video monitor or liquid crystal display (LCD) in the cart. Each hole of the course is selectively displayed with all of its hazards and features, with an icon representing the fixed or changing position of the roving unit superimposed in real time on the map of the hole being played. The golfer is provided by the system with an accurate measurement of the distance from the current position of the cart (e.g., at the tee box or other location on the hole) to the current pin placement, a hazard, or any other feature of the hole.

The PROLINK system provides many advantages to the golfer without burdening or significantly changing the way the course or any particular hole is played, or how business is conducted by course management—advantages such as real-time, accurate indications of distance (typically within two meters) from the cart to significant course features —green, pin, hazards on fairway, etc.; a relatively large, high resolution, color display with the capability for selection of a map of the entire course or any individual hole or other detailed feature; and a capability of individualized communications and messaging to and from the cart. The hole display and yardage functions in the cart system are activated automatically as the cart approaches the tee box at commencement of play of each hole. A movable cursor on the display allows the player to point to any feature on the displayed map to obtain a precise yardage measurement from the position of the cart. An automatic zoom feature increases the selected target area resolution, such as to view the contour of the green or the details of a particular hazard. The PROLINK system also enables the player to make consistently better and faster club selection from the information concerning target distance and hole layout.

The course management portion of the PROLINK system includes a base station computer unit, receiver/transmitter unit and video monitor in the clubhouse (or other desired location) to give the course administrator better insight into daily operations and revenues by providing a capability to identify, locate and monitor movement of every golf cart on the course in real-time; to use that knowledge to pinpoint and analyze the cause of bottlenecks on the course; to compile an extensive computerized data base useful for statistical insight into course operations and techniques for instituting improvements; and to communicate with all carts on the course, and to enhance course revenues through advertising and promotions broadcast to the cart monitors.

The PROLINK system also employs a technique and method for collecting survey data to map the layout of the golf course including such features as tee boxes, greens, fairways, cart paths, water hazards and sand traps. The collected survey data is post-processed and efficiently stored in memory in vector form for later retrieval and display. This data representing the golf course layout is used to efficiently determine the location of a golf cart relative to predetermined zones or regions.

Despite the capabilities of GPS and DGPS systems for their intended purpose, in golf course and other positioning, distance measuring, and ranging applications, such systems suffer loss of signal and, therefore, loss of communication and capability, when the roving unit moves behind an obstruction. On the golf course, this is particularly troublesome where the course is heavily treed, or has hilly terrain, or has on-course or adjacent buildings or other structures, or all of these types of obstructions, of sufficient dimensions to obscure or interfere with strong signal transmission. In these conditions, the golfer is inevitably faced with an "out-of-service" display screen on the cart monitor.

Co-pending U.S. patent application Ser. No. 08/690,962 titled "Robust Golf Navigation System" filed Aug. 1, 1996 in the names of J. Coffee et al. and commonly assigned with this application (hereinafter "the '962 application") discloses a dead reckoning system that overcomes these problems. The '962 application is incorporated in its entirety herein, by reference. The ACUTRAK™ golf course yardage and information system (ACUTRAK is a trademark of PROLINK, INC., assignee of the present application), as that system is called, employs the advantages of a dead reckoning-based yardage system, with support of DGPS for calibration purposes only, and combined with the full-featured management and information capabilities of the PROLINK system. In the ACUTRAK system, the desirable attributes of a dead reckoning system are combined with limited aspects of a GPS system, through optimal estimation computer algorithms preferably using a Kalman filter, to achieve a significant synergistic improvement in performance of a golf course position, distance measurement, navigation, information, and course management system over a wide operating envelope.

The ACUTRAK system is golf cart-based, but could be packaged alternatively in smaller vehicles, even a set of golf bag wheels equipped with a mobile unit or a hand-held unit used with a pedometer version of the wheel-tracking system disclosed in the '962 application. That system utilizes virtually all of the features of the PROLINK system disclosed in the '295 and '905 applications, except that the ACUTRAK system places limited reliance on DGPS, using it as a calibration technique only. In its primary functions the ACUTRAK system employs a dead reckoning system that tracks distance moved by and orientation of the wheels, extrapolated to the heading or bearing of the golf cart (or other roving unit) in which a portion of the overall system is incorporated. The ACUTRAK system is unaffected by even frequent inability to view a satellite navigation system, such as the GPS satellites, requiring only relatively infrequent calibration during play to avoid a gradual increase or buildup of error in measurements as the cart is driven about the course. Thus, instead of experiencing frequent out-of-service indications on the cart monitor, the golfer is cognizant only of continuous, reliable, highly accurate operation of the ACUTRAK system.

The principal features and technology of the ACUTRAK system are not limited to position, distance measurement, navigation, and information on a golf course. Rather, the system may be extended to many other consumer, commercial, and industrial applications of satellite navigation and digital communications technology where problems of GPS or DGPS signal loss can occur whether because of physical obstructions in the vicinity of the roving unit, line of sight problems, or interference from other, stronger signals. Indeed, the ACUTRAK system is usable in virtually any commercial endeavor where it is necessary or desirable to keep track reliably of the accurate position, distance relative to a given point, and/or navigation of a host of roving units, such as in a vehicle fleet management system, package delivery system, or other transportation system, or an agricultural planting and harvesting system, where obstructions or other interference abound.

Also, although the ACUTRAK system is preferably golf cart-based, it could be packaged alternatively or additionally in smaller vehicles, or even in or with a set of golf bag wheels equipped with a mobile unit or a hand-held unit used with a pedometer version of its wheel-tracking system. Any generic terminology used in this application, such as "mobile unit," "portable unit," "roving unit," and the like is intended to apply to any version of the system that utilizes high bandwidth dead reckoning navigation technology which is calibrated by low bandwidth satellite navigation technology. Advantages provided by the synergistic use of these technologies are enhanced by additional features and aspects which are incorporated in hardware and software to provide, for example, fixed distance measurements, in contrast to varying distance measurements resulting from the player's (or more generally, the user's) movement, information communication between base station and roving units, and traffic management.

In the ACUTRAK system disclosed in the '962 application, the dead reckoning (DR, alternatively referred to as dead reckoning navigation or DRN) system is the golf cart navigator which determines distance (yardage) measurements as well as heading. Other information derived from DGPS is used solely to calibrate the DR errors in real time so that each cart is periodically calibrated and re-calibrated to survey points during play. With each calibration, accumulated DR errors are reduced such that wheel scale factor (SF) and compass misalignment errors become very small compared to the uncalibrated nominal errors. They are not completely eliminated, however, because of temperature changes, heating up of cart tires, and tilt effects on the compass. Nevertheless, the DR errors grow slowly after each calibration, so that accuracy of within approximately two yards on distance measurements for the yardage traversed on about a par 5 golf hole, which is a distance of about 500 yards, can be maintained. Generally, at some point on every fairway from tee box to green at least minimal LOS to GPS satellites is available so that calibration can be performed, and the calibration is automatic.

The distance which may be traveled with the DR navigation system of the '962 application with highly accurate distance measurement (e.g., within two yards) is a function of the precision and sophistication of the DR sensor(s). It is possible, for example, to play an entire round of golf with only a single initial DGPS calibration for that level of yardage measurement accuracy, given a suitable DR sensor—but a compromise between precision/ accuracy of the product and its cost is necessary for a practical system.

Only GPS raw pseudo-range and range rate measurements are used to calibrate the DR system. Calibration of errors can be performed with fewer than four GPS satellites in LOS view to the golf cart; in fact, availability of only one GPS satellite will suffice for calibration. In the ACUTRAK system of the '962 application, the "method one" DGPS approach of Blackwell (supra) is used to provide corrections for the GPS pseudo-range and range rate measurements. In "method one," the base station measures the error between the estimated base station pseudo range to the GPS satellite (based on the known location of the base station GPS antenna) and the measured GPS receiver pseudo range to the GPS satellite. Errors in the range rate are also measured, and all raw measurement errors are computed for each satellite in LOS view of the base station antenna. The errors are then broadcast to the roving units so that the roving unit GPS receivers can subtract each satellite pseudo range error from each satellite pseudo range measurement. The roving unit need only apply the corrections to the subset of GPS satellites being tracked by it at that particular time. The corrected pseudo range measurements for the satellites in its LOS view are then used by the roving unit GPS receiver to compute the position, velocity, time (PVT) solution that is provided to the user for navigation.

In contradistinction, the so-called "method two" approach calls for the base station to measure the position error between the known base station GPS antenna position (latitude, longitude, and altitude) and the GPS receiver computed position (latitude, longitude, and altitude) to compute a correction in north and east position. That correction is broadcast to all roving units on the system. But since the roving unit might be looking at any subset of the total number and arrangement of GPS satellites being viewed by the base station, and the correction is unique to the specific satellites the roving unit is tracking, the base station must broadcast a north and east position correction for each and every possible combination of satellites. Clearly, this is a considerable and recurring quantity of data. The roving unit then selects the north and east position corrections corresponding to the set of satellites being tracked, and applies them to the GPS receiver latitude, longitude, and altitude output.

The requirement of substantially greater communications bandwidth for the DGPS correction information is perhaps the greatest drawback of the method two approach relative to method one. Method one also provides a "cleaner" solution which allows greater flexibility in selecting filtering algorithms to be employed for enhanced performance. Industry standard RTCM-104 was created to encourage and take advantage of the more efficient method one approach. In the disclosure of the '962 application, a floated sensor compass and a single front wheel sensor are used in a preferred embodiment of the DR navigation system of the cart, with the method one DGPS technique used for calibration. The same is true of the present invention, the difference relative to the '962 application residing in the sensor implementation.

Mechanical issues addressed in the implementation of sensors of the ACUTRAK system on a golf cart include (1) selection and mounting of the wheel sensor used for measuring distance traversed by the cart, and (2) selection and mounting of the electronic compass used for measuring bearing (direction, relative to a reference direction, typically true north). It is necessary to determine the most desirable or advantageous wheel for location of the wheel sensor on the golf cart. The rear wheels of the cart undergo slippage during rapid acceleration and braking on wet grass; hence, mounting the sensor on a rear wheel is more likely to result in errors in determination of distance traveled by the cart under those conditions. On the other hand, since the front wheels of the cart can turn, wheel velocity is computed along the direction that the wheel is pointed rather than the direction the cart frame is pointed. Resulting error may be overcome mathematically in navigation software for the ACUTRAK system, as described in the '962 application.

Selection of a proper sensor for detecting wheel rotation involves several factors. Hall effect sensors detect the presence of magnetic fields and are sufficiently rugged to withstand outdoor extremes of temperature, moisture, and soil contamination, with a limited capability to sense fine movements of the wheel as it rotates, for higher resolution. Optical sensors possess the capability to sense extremely fine movements, but lack robustness in an outdoor environment, and are more expensive than magnetic sensors.

The ACUTRAK system disclosed in the '962 application employs a dead reckoning system that uses a floated compass in conjunction, in one embodiment, with a wheel sensor mounted on one front wheel, with a special acceleration compensation algorithm referred to therein as "compass tilt estimation" algorithm for the floated compass. It is desirable for wheel rotation resolution to be at least 64 counts per wheel revolution, i.e., to possess the capability to detect at least every 5.625 degrees of revolution. A floated compass has a sensor which is floated in a liquid bath and which uses the Earth's gravity to keep the sensor level with respect to the gravity field, thereby resulting in the compass sensor remaining fixed with respect to the earth's magnetic field. In this way, a floated compass allows accurate measurement of magnetic heading under various adverse conditions—for example, when the golf cart is tilted on a hill.

To overcome potential loss of accuracy arising from response of the floated compass to acceleration of the golf cart (e.g., starting, braking, or turning) such that the sensor is artificially tilted throughout an acceleration event, compensation for compass errors that arise during such an event is achieved in the system of the '962 application by high resolution wheel sensing to at least 64 counts per revolution, and an acceleration compensation algorithm run in the navigation computer to predict the effect of the induced tilt on the compass heading output. With a dual front wheel sensor configuration, even greater resolution is required—minimally about 720 counts per revolution (equating to a capability to detect at least every 0.5 degrees of revolution), because mathematical algorithms for such a configuration are highly sensitive to wheel quantization for accurate dead reckoning performance.

In an embodiment of the '962 application system, a wheel sensor constituting a standard optical encoder is employed, with modifications designed for survival of the sensor in the hostile outdoor environment of the golf course. The modifications include encapsulating the case of the sensor in an epoxy compound to seal it against penetration and fouling by water or soil, and using a sealed bearing on the encoder shaft for the same purpose. The wheel sensor has an effective resolution of 1024 counts per revolution, and is projected to be capable of 200 million rotations without failure. In practice, however, "sealed" bearings are something of a misnomer in that they do not filly inhibit fouling in a hostile environment. Hence, the sensor and the accuracy of the system must be subjected to frequent inspection. Servicing or replacement of the wheel sensor must be undertaken in aggravated cases. It would be desirable to provide an improved wheel sensor system, and it is a principal objective of the present invention to do so.

SUMMARY OF THE INVENTION

According to the present invention, an ACUTRAK system is implemented in part using a wheel sensor in the form of Hall effect magnetic rotation system. A floated compass is used in conjunction with the wheel sensor for accurate measurement of the rotation and the direction of rotation of the wheel. The sensor element is attached to a mounting bracket, and a magnetic strip is attached to a mounting frame. The data collected is used to measure distance traveled and cart velocity, as well as detection of vehicle motion, among other things. Unlike other types of wheel sensors, the magnetic wheel sensor is capable of providing rotation measurements in electrically and magnetically noisy environments. This is achieved in part by making the housing for the Hall effect sensors electrically conductive and grounding it to the internal sensor ground. Additionally, the Hall effect sensor assembly is electrically insulated from the chassis of the golf cart. The system generates its data output without any physical interfaces, which effectively eliminates sources of degradation attributable to friction. Moreover, the magnetic wheel sensor can be fully sealed by electrically connecting the sensor integrated circuit (IC) to a printed circuit board, inserting the board into the housing, and then potting the board and the sensor IC assembled thereon completely in place with epoxy, for example, to avoid damage from outside contaminants. Additional advantages of the magnetic wheel sensor are its relative simplicity of assembly, installation, and inspection.

According to the invention, then, apparatus is provided for installation on a golf cart to enable calculation of the distance from the cart to a golf cup, a hazard, or other feature of a hole of a golf course which has been surveyed so that the location of such feature is known, from which to make a close approximation of the distance to such feature from a golf ball in a lie proximate to the cart. The apparatus includes a dead reckoning (DR) wheel sensor arrangement for determining speed and direction (forward/reverse) of the cart relative to a tee box of the hole as a known point of origin to which the DR assembly has been calibrated. The arrangement includes a magnetic strip with a plurality of alternating magnetic poles impressed across the strip, which is attached to the rim of a mounting fixture inside the wheel well of the cart. The Hall effect sensor assembly is affixed to the axle of the wheel for detecting passage of the alternating magnetic poles on the strip during rotation of the wheel. A floated compass is attached to the cart, preferably substantially directly above this wheel, to determine the cart heading. Knowing the parameters of speed, forward/reverse direction, and heading of the cart at any given instant relative to the origin enables calculation of real-time distance from the cart to the known location of a feature of interest of the hole being played with the cart.

Selection of the cart wheel to be used for this arrangement is somewhat arbitrary, although as will be noted presently, the left front wheel of the cart is preferred. In one embodiment, the left front wheel was selected to minimize potential errors with the cart's GPS antenna, which was mounted on the left side of the electronics module. Additionally, the driver of the cart sits in the left seat, and therefore a greater frictional force is present on the left front tire than on the right front tire.

A global positioning system receiver of the cart receives differential GPS position signals which are used to re-calibrate the DR wheel sensor assembly at least once during play of each hole to restore a level of accuracy to the calculation of distance by substantially removing error buildup arising since the previous calibration.

Using the invention, a method is provided for performing a relatively accurate calculation of the distance of the ball to a feature of interest on a hole of a golf course which has been surveyed so that the locations of various features on each hole are known. A golf cart on which a dead reckoning navigation (DRN) system is installed (including the magnetic wheel sensor assembly for determining speed and direction of the golf cart and the compass for determining heading of the golf cart during movement thereof and ultimately determining the position of the golf cart) is positioned adjacent a tee box of a hole to be played on the course, as an origin of coordinates for the relative position of the golf cart. After a tee shot, the golf cart is repositioned adjacent the new position of the ball resulting from that shot. As the golf cart is being repositioned, the coordinates of the new position of the ball relative to the origin are determined from the DRN system. Using the new position coordinates in conjunction with the known position coordinates of the cup for the hole being played, the approximate distance from the new position of the ball to the cup is ascertained. At least once during play of a hole, the DRN system is re-calibrated to restore a level of accuracy of measurements by the DRN system by substantially removing error buildup since the previous calibration of the DRN system from the determinations.

As used herein, the term "coordinates" is simply intended to refer to the location of an object regardless of the specific form of mapping or surveying, which may, for example, be of the type described and claimed in the '295 application, and not necessarily to an X-Y plot, bit mapping, or the like.

The invention is also usable in a system for determining the precise locations of a plurality of golf carts on a golf course in real time, as the golf carts are being used during play of the golf course, for purposes of course administration and management. This task, that is, of observing the pace of play on the course and any trouble spots on a video monitor or other display, is conveniently handled at the pro shop or elsewhere in the clubhouse. There, a base station is provided which includes apparatus for wireless communication with each of the golf carts on the course, including receipt of information from each cart regarding its location as determined by an on-board navigation system for display on a course map on the monitor.

Each of the carts is outfitted with a DRN system of the type embodying the invention, with the magnetic wheel sensor assembly for determining the speed and direction of the cart, and the compass or the like constituting means for calculating the heading of the cart on the course, so as to fix the location of the cart relative to at least one known landmark of the course. The landmark may be any natural or artificial object or feature such as a marker or a tee box, whose location is known, as by course mapping, and to which the DRN system of the cart has been calibrated. In addition to the DRN system, each cart is outfitted with apparatus for wireless communication with the base station, including communication of data derived from calculations employing the DRN system which are indicative of location of the relative to at least the one known landmark. Each cart is also provided with a receiver for receiving differential global positioning system (DGPS) signals from earth satellites in unobstructed line of sight (LOS) to the cart for re-calibration of its DRN system from time to time during each round of play of the course relative to a known landmark, which might typically be the tee box location for the hole being played. In this way, the accuracy of the DRN system of the cart is restored for relatively accurate determination of real-time location of the cart on the course.

BRIEF DESCRIPTION OF THE DRAWINGS

The above and still further objects, features, aspects and attendant advantages of the present invention will become apparent from a consideration of the following detailed description of the best mode presently contemplated for practicing the invention, with reference to a preferred embodiment and method, in conjunction with the accompanying drawings, in which.

DETAILED DESCRIPTION OF PREFERRED EMBODIMENTS AND METHODS

Figure 1:
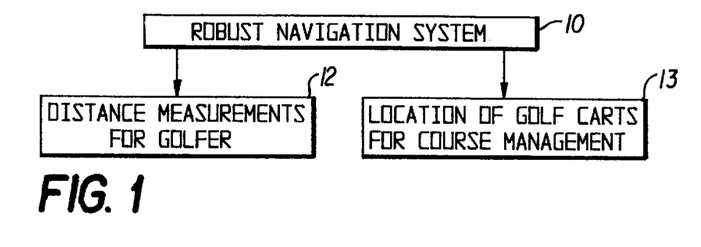
FIG. 1 is a simplified block diagram of a robust golf navigation system to provide distance measurements as an aid to the golfer's game, and position measurements for real-time observation of cart locations on the course by the course administrator.

Certain Figures of the drawing correspond to those presented in the '962 application, and are duplicated here strictly for the sake of convenience and clarity to the reader. In FIG. 1, a robust golf navigation system 10 serves to generate reliable information for providing distance measurements 12 between any golf cart of the system and various features of the course such as distance to the cup of the hole being played, as an adjunct to the golfer's game, and for providing position measurements 13 of carts on a map of the course for real time observation of cart locations by the course administrator. The ACUTRAK system in which the present invention is used is "robust" in the sense that it provides accurate and reliable yardage measurements over a wide range of operating conditions, including courses which have extensive tree canopies or very hilly conditions, in contrast, for example, to systems that are wholly or primarily reliant on GPS. As noted earlier herein, the ACUTRAK system employs dead reckoning navigation in conjunction with periodic or even sporadic calibration using DGPS.

As is known, "dead reckoning navigation" is initialized with a starting position, velocity, and, in some instances, attitude of the host vehicle, and keeps track of changes in movement, distance and direction of the vehicle from the starting point. The present invention provides an improved wheel rotation sensor as a key component of a cost effective dead reckoning navigation system for use on a golf course. The sensor enables measurement of distance by reference to the number of rotations of the wheel from the starting point, while the direction of travel, which need not and typically would not be a straight line from one point of interest to another, is determined in the horizontal plane by means of an inexpensive compass sensor, for example.

A dead reckoning system can provide information at rates of hundreds of times per second, enable measurement of yardage to a fraction of an inch at any sampling instant, and is not susceptible to masking that would preclude GPS yardage measurements. Dead reckoning systems are limited, however, by sources of error that grow with distance traveled. Using a wheel sensor to measure distance and a compass to measure bearing or heading, as in the present invention, error sources include wheel scale factor (SF), magnetic heading variation error, sensor noise, and wheel spin, as well as potential compass-based errors. For example, tire pressure affects wheel diameter which can produce related error in measurement of distance traveled. It is necessary to provide a capability to estimate errors and to apply corrections so that golf course yardage is measured with accuracy using the dead reckoning system.

In the ACUTRAK system, DGPS is preferably used for calibration to limit the buildup of error. Calibration of the dead reckoning (DR) navigation system may be performed at any time satellite LOS is optimal, although it is not necessary that the calibration be continuous or even frequent. Calibration once per hole, or at intervals of 500 yards, is more than sufficient, and suitable LOS conditions would typically be available at least once during that travel interval. An automatically calibrated DR system will continue to perform well to provide high accuracy yardage information to the golfer, without need for any input from the golfer which would represent a distraction from play of the game.

The preferred approach in the DR system for golf course applications uses a single front wheel sensor to measure distance and a floated sensor compass for measuring direction. Only speed and direction in the horizontal plane are needed. Alternatives include use of (i) dual front wheel sensors detecting the wheel rotation for measuring distance, and measuring the difference between the wheel rotations for determining the angular rate; or (ii) a fixed sensor compass for detecting direction, a terrain database for slope locations, and a single front wheel sensor for measuring distance. Dual front wheel sensors are viable but have the disadvantage that turning the front wheels of the cart causes them to be misaligned with the longitudinal axis of the cart Alternative (ii) is also viable, but requires a sophisticated terrain database to determine the severity of the slope at any particular location on the golf course.

Figure 2:
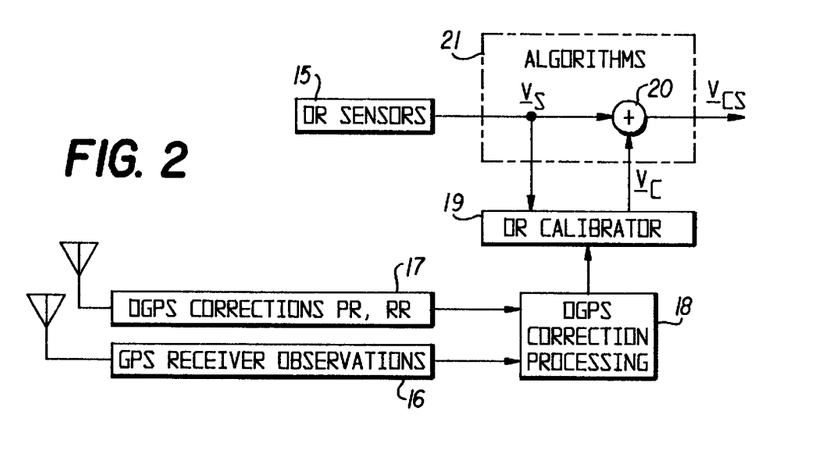
FIG. 2 is a block diagram of a generalized dead reckoning (DR) navigation system using differential GPS (DGPS) calibration.

Referring to FIG. 2, a block diagram for a generalized DR navigator using differential GPS (DGPS) calibration, DR sensors 15 provide a golf cart state vector which is corrupted by errors that grow with time and/or distance. GPS receiver 16 provides observations of the pseudo-range and range rate to each GPS satellite in LOS view. Errors in these observations are corrected to an appropriate extent by use of a digital radio system 17 which receives DGPS corrections of pseudo-range and range rate. The corrections are processed using conventional DGPS correction processing 18 to obtain more accurate observations of these parameters for the respective golf cart.

DR calibrator 19 compares the DR navigation data in the form of state vector $V_s$ from DR sensors 15 to the DGPS corrections from processor 18 to compute DR calibration corrections, which are used to provide a corrected vector $V_c$ to the DR navigation solution at 20 within algorithm section 21 for an accurate and robust corrected golf cart state vector $V_{cs}$.

In conjunction with the preferred embodiment of a wheel sensor mounted on one front wheel, the floated compass employs a compass tilt estimation algorithm described in detail in the '962 application. The floated compass uses a sensor floated in a liquid bath so that the sensor remains fixed with respect to the earth's gravity and magnetic field, whereby to enable accurate measurement of heading even when the golf cart is tilted on a hill. It is desirable that wheel rotation resolution be at least 64 counts per wheel revolution, to detect at least every 5.625 degrees of revolution. The floated compass sensor is artificially tilted during cart acceleration in starting, braking, or turning, producing errors which are compensated by (i) the high resolution wheel sensing and (ii) the compass tilt estimation algorithm.

Dual front wheel sensors require greater resolution, on the order of minimum resolution of 720 counts per revolution which equates to detection of every 0.5 degrees of revolution. This is because the mathematical algorithms for a dual front wheel application are extremely sensitive to wheel quantization for accurate dead reckoning performance.

Figure 3:
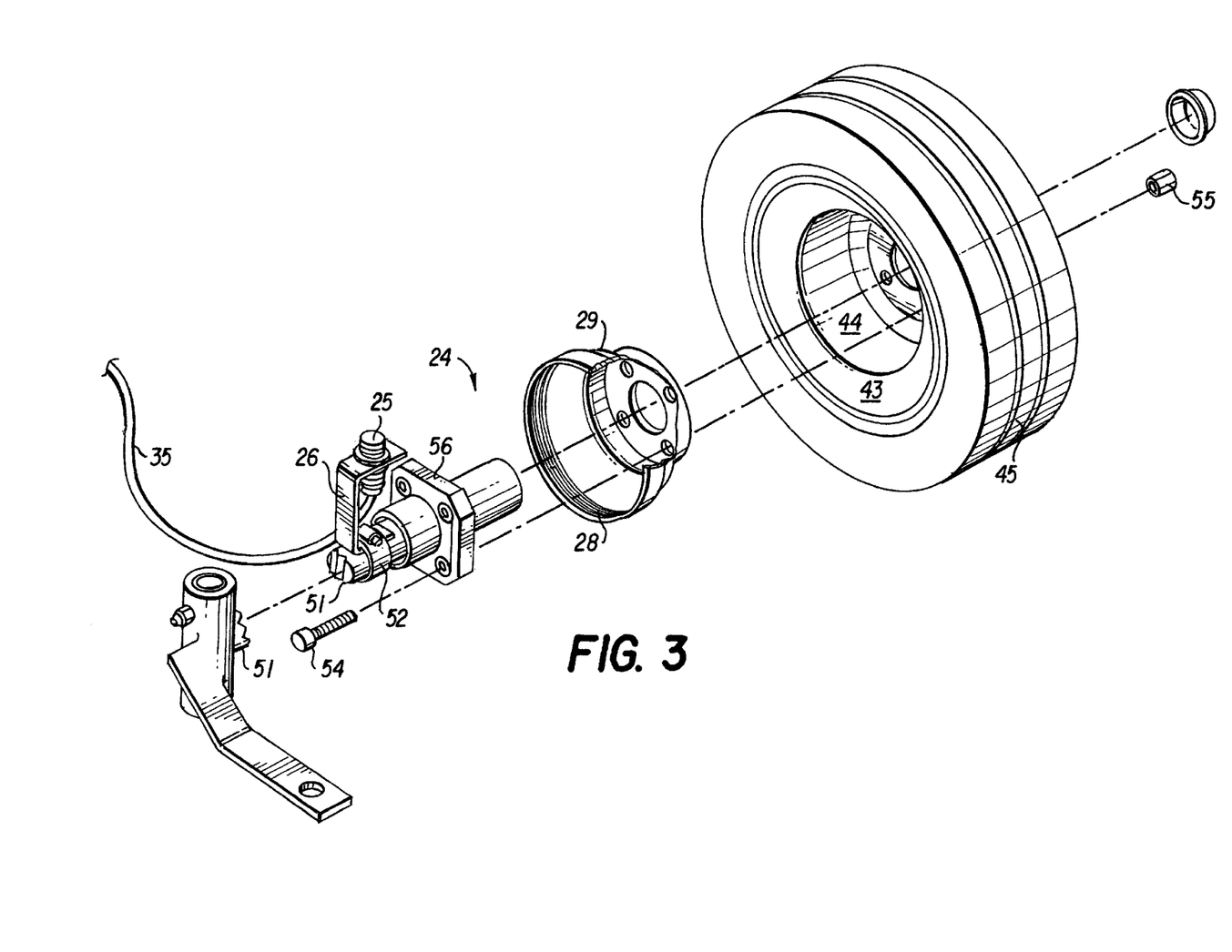
FIG. 3 is an exploded perspective view of a preferred embodiment of a wheel sensor assembly for a DR navigation system, according to the present invention.
Figure 4:
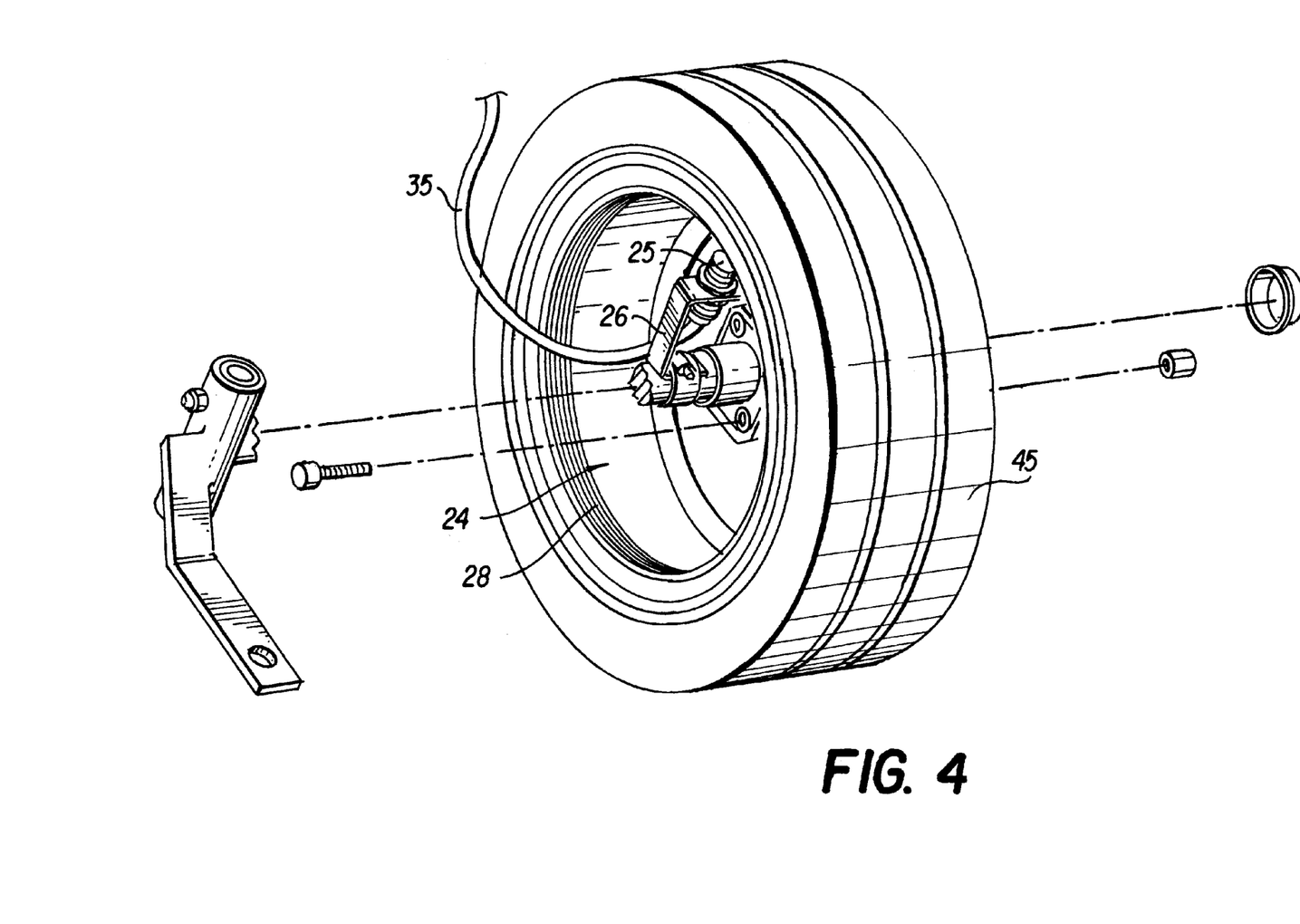
FIG. 4 is an assembled perspective view of the wheel sensor assembly embodiment of FIG. 3.
Figures 5A, 5B, 5C:
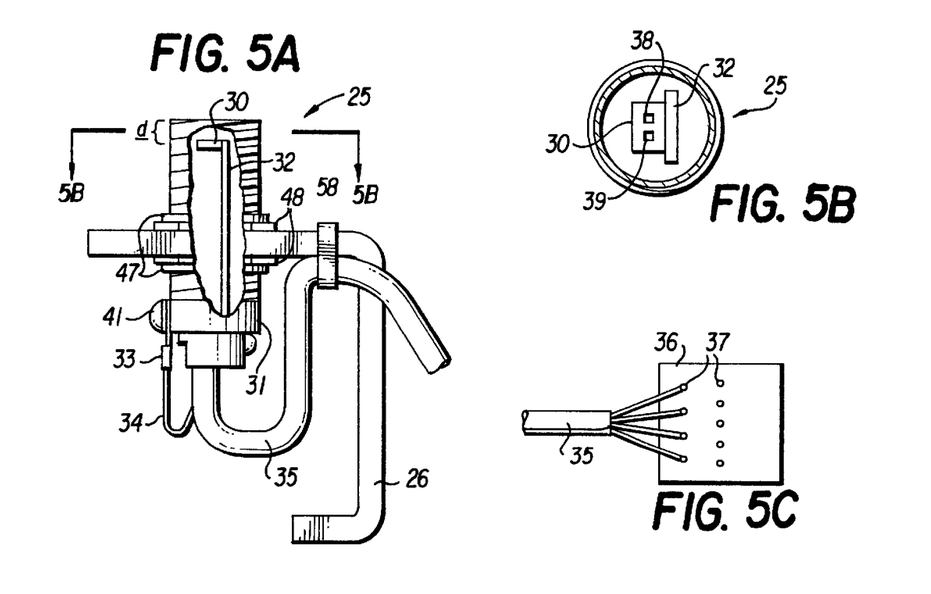
FIGS. 5A, 5B and 5C are respectively a side partly sectioned view of the Hall effect sensor device assembled on a mounting bracket, an open end view, and the end of a cable connected to the sensor device.

In a preferred embodiment of a wheel sensor assembly 24 of the present invention, shown in exploded view in FIG. 3 and in assembled view in FIG. 4, the magnetic wheel rotation system includes a sensor 25, a sensor mounting bracket 26, a magnetic strip 28, and a magnet mounting fixture 29. As further shown in the more detailed sectioned side view of FIG. 5A, the sensor 25 includes a dual element Hall effect sensor device 30, which, in the preferred embodiment is a Hall effect speed/direction sensor (e.g., part number A3421, available from Allegro Microsystems, Inc. of Worcester, Mass.). The Hall effect sensor device 30 is soldered to a printed wiring board or printed circuit board (PCB) 32, and the PCB with attached sensor is then inserted into a metallic (electrically conductive) cylindrical housing or cylinder 31 (see, also, FIG. 5B). As shown in FIG. 5A, also provided are a grounding lug 33 from a short wire 34 associated with a four conductor shielded cable 35 (FIG. 5C), a connector 36, and connector pins 37, for purposes to be described presently.

The Hall effect sensor device 30 is a dual element device, in which the two Hall effect sensors 38 and 39 thereof(FIG. 5B) are mounted and positioned a precise distance apart in conjunction with electrical circuitry necessary to drive the Hall effect sensors and produce speed and direction outputs. The two sensors provide the device with the capability to sense movement of the cart in both a forward direction and a backward direction. In the forward direction, one sensor leads the other, whereas in the backward direction, the reverse is true. In the exemplary Allegro A3421 part referred to above, quadrature encoded signals are decoded in the part, and the output signals therefrom are indicative of speed (pulses per second or pps) and direction of the cart. The end of the PCB 32 opposite that to which sensor device 30 is mounted has electrical connections to the conductors of the shielded cable 35 which lead to electrical circuitry of the cart's DR electronics.

With continued reference to FIG. 5A, short wire 34 and grounding lug 33 crimped thereto are fastened to housing cylinder 31 by a corrosive-resistant screw 41, to assure that the cylinder shares the same electrical ground with the Hall effect sensors 38, 39. The use of an electrically conductive housing which is grounded in this manner serves to shield the device against electrical and magnetic noise present in the environment in which the housing is located, and which would otherwise preclude proper operation and functioning of the Hall effect sensor. The PCB 32 is dimensioned and configured to slide into the metal cylinder 31 so as to position the attached sensor device a minimum distance d (typically, 0.020 inch) from one end of the cylinder, facing the magnetic strip 28 (FIGS. 3 and 4) when the wheel sensor assembly is fully assembled on a front wheel of the cart. This configuration helps to maximize the performance of the magnetic wheel rotation system of wheel sensor assembly 24.

After insertion of the PCB 32 with sensor device 30 mounted thereon, but before assembly onto a mounting bracket and connection of grounding lug 33, the metal cylinder 31 is filled with suitable benign potting compound (such as epoxy). This filler serves both to prevent sensor 30 from moving (relative to each of metallic cylinder 31 and external magnetic strip 28), and to serve as a barrier against contamination or fouling as a consequence of the hostile environment of the golf course. The hostility of the course to the DR system of the cart exists from presence of soil, fertilizer, water, mud, debris, and the like which can be churned up onto the wheel hub 43 (FIGS. 3 and 4) and into the wheel well 44 of the wheel 45 on which the wheel sensor assembly 24 is mounted, and onto the wheel sensor assembly 24 itself, as the cart is driven about the course. When the potting compound has cured, the exposed ends of the wire conductors at the opposite end of the four conductor cable 35 are terminated with male connector pins 37 which are then inserted into female connector terminals in the connector body 36.

As shown most clearly in FIG. 5A, the completed dual element Hall effect sensor device 30 is attached to mounting bracket 26 with two clamping nuts 47 and two nylon shoulder washers 48. The nylon washers 48 serve to provide electrical insulation between the electrically conductive cylinder 31 that houses the Hall effect sensor and the chassis of the cart 50 which would otherwise be electrically coupled via mounting bracket 26. This is another important aspect of assuring that the sensor functions properly in the environment in which it is being used (including that produced by the electric cart). The mounting bracket may be composed of any rigid, high strength material to maintain the close spacing between the end of Hall effect sensor 30 and magnetic strip 28, but is preferably made from a nonferrous material to minimize the possibility of magnetic fields being coupled to the area near the sensor.

Magnetic strip 28 attached to the magnet mounting fixture 29 is long, thin and pliable so as to allow the strip to be securely affixed in place by means of an adhesive, such as Loctite-Depend™ 330, to the inside surface of the magnet mounting fixture, as shown most clearly in FIGS. 3 and 4. The magnetic strip is arranged to be placed directly opposite an end of Hall effect sensor device 30 when the sensor device and the magnet mounting fixture are installed in proper position on the cart. The strip itself is preferably composed of a nitrile rubber binder containing oriented barium ferrite or strontium ferrite magnet material. Typical but non-limiting dimensions of the magnetic strip are a length of 22.6250 inches by a width of 0.5000 inch by a thickness of 0.1250 inch.

Strip 28 is magnetized with north and south poles arranged in an alternating pattern (for example, alternating poles every ¼ inch for the exemplary length dimension noted above) as viewed from the surface of the magnetic strip confronting an end of Hall effect sensor device 30 when the unit is assembled onto a front wheel of the golf cart. All of the alternating poles are of the same width. Ideally, the magnetic strip has a length such that an integer number of north-south pole pairs is present when it is installed onto the magnet mounting fixture 29. In practice, however, the magnetic strip length—such as that in the above example—may be slightly longer to compensate for contraction of the magnetic material during assembly (90-½ poles, rather than 90 poles, in the latter example). This slight additional length will degrade the instantaneous accuracy of the wheel rotation sensor system to a virtually negligible extent. Since there is no contact between elements of sensor device 30 and magnetic strip 28 during relative movement therebetween when the golf cart is in use, the sensor system itself will not suffer degradation or wear as a result of any frictional force, which is a distinct advantage.

The magnet mounting fixture 29 is a somewhat bowl-shaped piece of material intended to mate with the inner portion of the wheel hub 43 and with mounting holes that mate with mounting holes of the hub, so that fixture 29 will accept the wheel mounting lugs or bolts of the vehicle. It is essential that the magnet mounting fixture mounting holes be precisely sized and aligned with those of the vehicle wheel mounting lugs to minimize any variation in the spacing between magnetic strip 28 and sensor device 30 during relative rotation of the two after installation of the wheel sensor assembly on the cart. The magnet mounting fixture is specially constructed to allow the magnetic strip 29 to be attached to its internal surface at the rim portion of the fixture, without the presence of protuberances or unevenness of any other kind. The adhesive used to attach the magnetic strip to the magnet mounting fixture, while not confined to the exemplary Loctite material referred to above, should be selected to avoid any adverse effect from materials or temperatures likely to encountered by the cart during normal use.

The longitudinal position of the sensor device 30 within mounting bracket 26 is determined by use of a manufacturing fixture which is specific to the geometry of the wheel assembly of the golf cart on which the sensor bracket is to be mounted. In this way, the high tolerance alignment or adjustment is accomplished during the manufacturing/assembly process, rather than during installation in the less hospitable environs of the golf course, which also results in a substantial saving of time in the installation process.

It is important to observe that as a result of the design provided by the present invention, the lateral alignment of the sensor to the magnetic strip is not crucial. In practice, the wheel sensor assembly bracket is readily attached to the cart, and the wheel is then bolted on in the usual manner, with little or no need for any further adjustment. As noted earlier herein, while either front wheel may be selected as the one with which the assembly is to cooperate, the left front wheel is preferred, taking into account factors such as the location and added weight of the driver of the cart, the location of the antenna for the GPS system to be used for periodic or sporadic calibration of the DR navigation system, and the proximity to fixed sources of potential electrical or magnetic interference on the cart. As a practical matter, the magnetic wheel sensor assembly 24 is installed on a fully assembled cart by removing the designated front wheel 45 from the hub of the cart 50. Once the wheel is removed, the sensor mounting bracket 26 is readily attached to the front axle 51 (or other suitable fixed part of the structure of the vehicle), so as to finally maintain the relative positions of the sensor device 30 and magnetic strip 28 to permit rotation of the latter about the former when the installation of the entire wheel sensor assembly 24 is completed.

Figure 6:
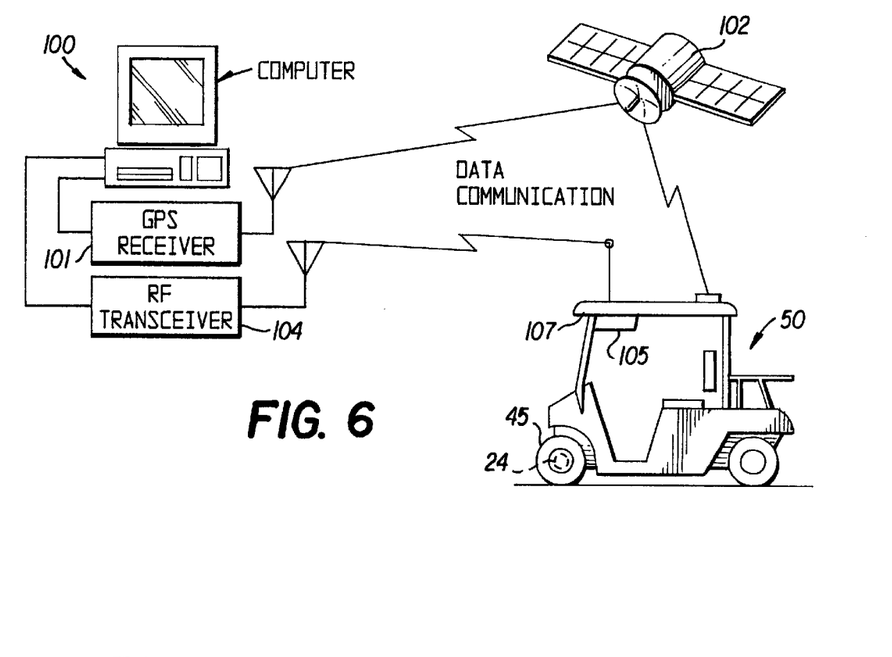
FIG. 6 is a simplified diagram of a golf cart outfitted with the DR system, communication transceiver and GPS receiver, and of the base station and GPS satellite.

By way of example, as illustrated in FIGS. 3, 4, and 6, the magnet mounting fixture 29 of wheel sensor assembly 24 resides in the wheel hub 43 of the front wheel 45 (e.g., on the left, or driver's, side) from its position on the front axle 51 of the golf cart 50. Mounting bracket 26 is slidably positioned along and above front axle 51 with an adjustable collar clamp 52 about its lower leg for rotational alignment of sensor device 30 with magnetic strip 28, i.e., so that the upper end of the Hall effect sensor device is aligned to directly confront the magnetic strip 28 at all times during rotation of the latter about the former, albeit that the two are maintained at all times in precise spaced-apart relation by the longitudinal alignment of the sensor device. The cable 35 is then routed such that it will not bind or be pinched by any portion of the structure, either while the cart is moving or at a standstill. To that end, as well as to prevent excessive stress or strain on the wire conductor connections of cable 35 to PCB 32 potted within cylinder 31, the cable may be secured to the mounting bracket 26 by a tie-down clamp 58 (FIG. 5). The magnet mounting fixture 29 is slid over the wheel mounting lugs for reinstallation of wheel 45. Upon proper rotational alignment of the sensor device 30 relative to the magnetic strip, the attachment bolts 54 (which have been inserted through respective mating holes in axle bearing mounting flange 56, magnet mounting fixture 29 and wheel hub 43 during the assembly process) are secured by final tightening of nuts 55 thereon, and the collar clamp 52 is tightened to secure the mounting bracket in place in the final assembly. Mounting of the Hall effect sensor device 30 above the axle 51 is preferred because in this location the axle keeps the sensor sheltered from water, mud, soil, rocks, grass, fertilizer, twigs, branches, and other debris that might be encountered as the cart is driven along the course during play. The location of the sensor device 30 inside the wheel well 44 at the rim thereof further protects the sensor. Of course, debris is much less a problem where the cart is used on courses having a "cart path only" rule for driving the golf cart.

The final assembly of the wheel sensor assembly 24 onto left front wheel 45 of cart 50 is shown most clearly in FIG. 4, with additional reference to FIG. 6.

The electrical isolation of electrically conductive sensor housing cylinder 31 from mounting bracket 26 prevents conducted electrical noise from being transmitted to the very sensitive Hall effect sensors in element 30 mounted on PCB 32 and potted within the cylinder. This is critical to achieving reliable and accurate magnetic measurements on a vehicle propelled by a pulse width modulated DC electric motor, as is the case with an electric golf cart. Large magnetic and electric fields are produced by such a motor, and shielding is imperative for the magnetic sensor approach of the present invention.

It will be observed from the foregoing description, that the wheel sensor assembly system is relatively simple and inexpensive to produce. Moreover, the system installation on the golf cart or other vehicle is also a relatively easy task, which is important to allow a fleet of golf carts to be readily implemented with the capabilities of the ACUTRAK system, and to be readily serviced for replacement of parts if and when the need arises.

The Hall effect sensor device 30 is supplied with power through the sensor cable 35 by means of a power wire and a ground wire among the four conductors. One of the remaining two conductor wires of cable 35 provides an output signal from the sensor device indicative of speed, the speed signal being composed of digital output pulses whose number is proportional to the number of magnetic poles on magnetic strip 28 that pass by the Hall effect sensor device 30 during rotation of the wheel as the cart is driven along the course. The remaining conductor wire of cable 35 provides an output signal from the sensor device indicative of direction (forward movement or backward movement of the cart) as described earlier herein. An alternate approach is to send the outputs of the two Hall effect sensors through these two wires directly to the DRN computer for quadrature decoding.

Referring to FIG. 6, the overall system includes a base station 100 typically located in the pro shop or clubhouse of the course. At the base station a course management computer and video monitor receive synchronizing and other data from a GPS receiver 101 which acquires DGPS data transmissions from all GPS satellites such as 102 in LOS. A transceiver 104 provides wireless (e.g., radio frequency) communication with a plurality of carts such as 50, each equipped with an on-board transceiver for that purpose and a receiver of DGPS signals from the satellites for re-calibration of the on-board DR navigation system, preferably at least once for each hole. Each cart also has its own high resolution roof-mounted video display 105 which may include a map of the hole being played replete with location of tee box, hazards, fairway, rough including stands of trees, green and cup, as well as an icon identifying the cart which moves on the display as the cart is driven along the hole. The display also provides an indication of the distance from the cart to the cup and to other objects and features of the particular hole, selectable by the golfer's movement of a cursor on the display screen. A detailed description of such operations and including the technique for data communications between individual carts and the base station is contained in other applications identified above as incorporated herein by reference.

The depiction of cart 50 in FIG. 6 also illustrates the location of magnetic wheel sensor assembly 24 at the inner wheel well and axle of left front wheel 45. The floated compass and its assembly, preferably mounted in the present embodiment in the roof assembly of the cart at 107 substantially directly above the location of the sensor assembly 24, are fully described in the '962 application, which is duplicated in pertinent part here for the sake of convenience and clarity to the reader. A preferred floated compass sensor is Model No. C-80 manufactured by KVH Industries of Middletown, R.I., to provide measurements of the magnetic heading accurate to one degree. The compass sensor is preferably mounted inside the system roof assembly on the left (driver) front side of the golf cart so that the compass is virtually directly above the top of the left front wheel of the cart. This mounting location minimizes lever arm effects between the wheel sensor and the compass, especially with acceleration compensation. The compass should be located as remotely as possible from any ferrous metal on the cart, to avoid distortion of the magnetic field and the direction of true north, which would degrade the accuracy of the compass readings.

Figure 7A:
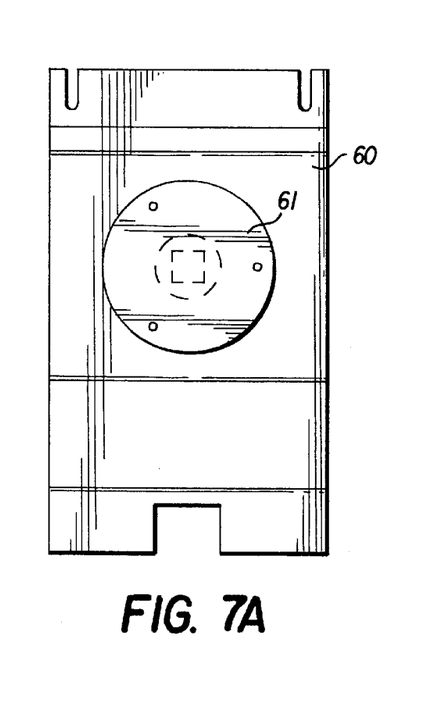
FIGS. 7A and 7B are top and side views of the compass assembly for the DR system.
Figure 7B:
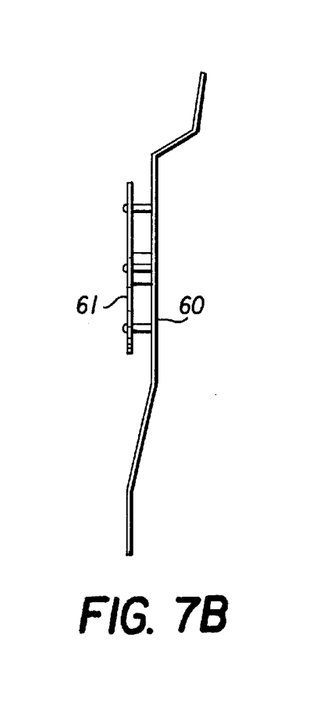

FIGS. 7A and 7B are top and side views of an exemplary compass assembly, illustrating one technique for assembling the compass onto a bracket 60 to be mounted in the roof assembly of the golf cart. The compass bracket 60 is composed of aluminum (avoiding the use of a ferrous metal) configured as a plate which is bent to maintain the compass sensor 61 in a generally level position when the roof assembly with bracket 60 mounted therein is installed on the golf cart. The compass mounts to the bracket over a small circular hole that accommodates a protruding magnetic sensor on the compass circuit card. As noted above, the compass sensor is maintained at a horizontal level orientation when the vehicle is on a grade, but cannot differentiate vehicle acceleration forces from gravitational forces so that vehicle turns, acceleration, and braking will cause the compass to tilt out of the horizontal plane and introduce heading errors. The '962 application fully describes the calculation of a compass tilt estimate of the effect of acceleration on a floated compass sensor to induce tilt, and its effect on the compass heading output, from data obtained from the compass and the wheel sensor, which will not be duplicated here. This estimate is used to compensate for tilt errors.

Figure 8:
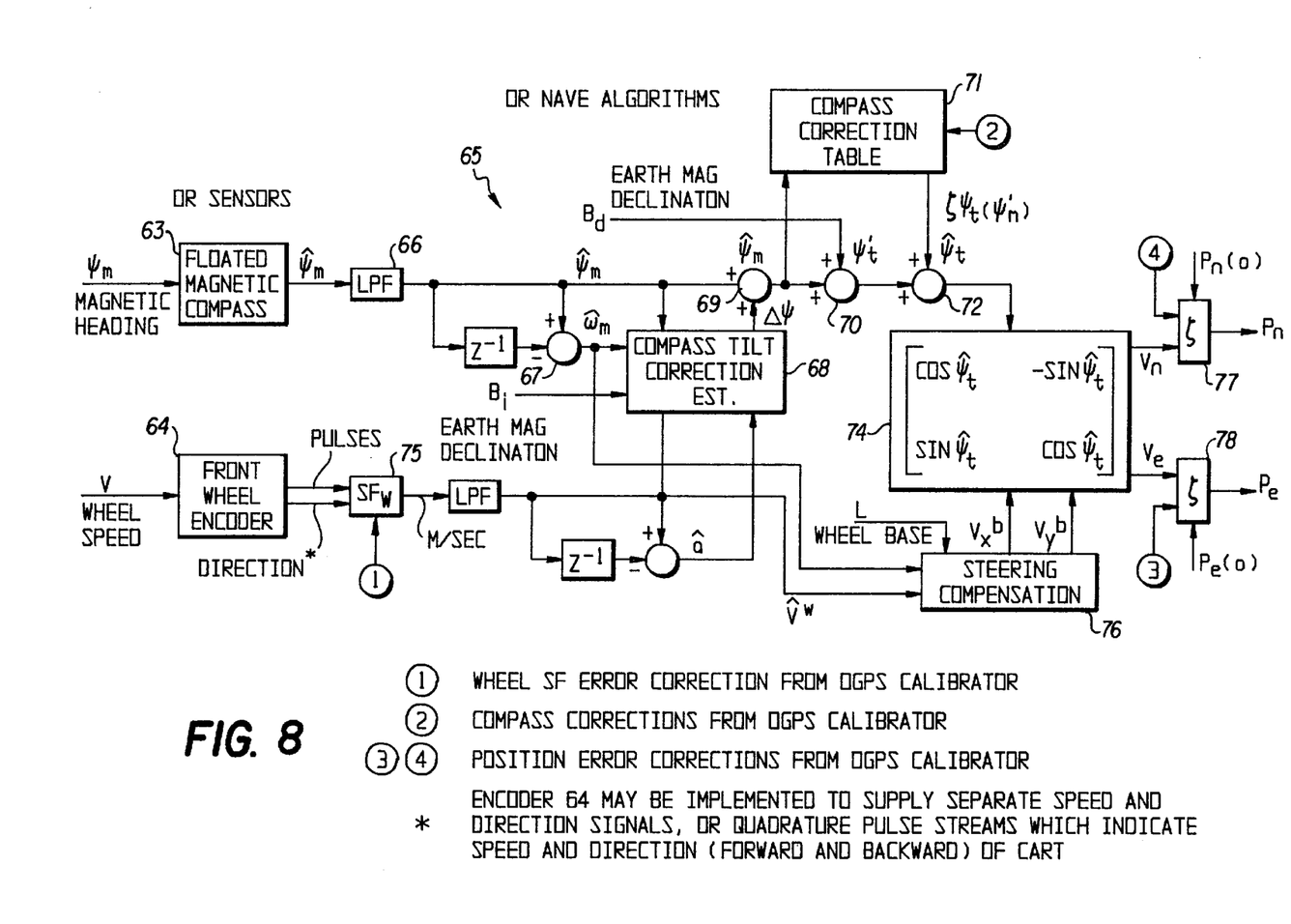
FIG. 8 is a block diagram of the preferred embodiment using the magnetic wheel sensor, together with a floated compass.

A floated compass/front wheel sensor system using the magnetic wheel sensor of the present invention is shown in block diagrammatic form in FIG. 8. The DR sensors are the floated magnetic compass 63 and magnetic wheel sensor 64. The outputs of both sensors ($\psi_m$ for 63 and a pulse stream and level indicative of wheel speed and direction for 64) are delivered to DR navigation algorithms section 65 following initial processing. Output $\psi_m$ is subjected to low pass filtering at 66, and the filtered information derived from the compass sensor output is applied, together with a factor $\omega_m$ related to rate of change of heading derived at 67 from the filtered output and a factor $Z^{-1}$ which is an inverse of the residual measurement, a factor $\beta_i$ representing the Earth's magnetic inclination, and inputs derived in similar fashion from the processed output of magnetic wheel sensor 64, relating to wheel speed $V^w$ and wheel acceleration $\alpha$, to develop a compass tilt estimate correction factor $\Delta\psi$ at 68. This correction factor is then applied at 69 to the processed output from the compass sensor 63 to compensate for tilt error.

The resulting data is applied to a compass correction table at 71 and is also added to a factor $\beta_d$ representing the Earth's magnetic declination at 70. The compass correction table (a lookup table) also receives an input of compass corrections from a DGPS/DR calibration which utilizes the differential GPS calibration to restore the accuracy of the dead reckoning navigation system. The table 71 correction $\delta\psi_1$ is added to the output of 70 at 72 and the result is applied to a table calculator 74 along with information derived from the magnetic wheel sensor output processing path.

In the latter path, the output of magnetic wheel sensor 64 is subjected to application of a wheel scale factor error correction $Sf_w$ from the DGPS/DR calibration at 75, to compensate an error that increases with distance traveled over time. The resulting output undergoes processing similar to that provided in the compass sensor path, as described above, so that the pair of outputs related to wheel speed and acceleration are obtained and applied to develop the compass tilt estimation at 68, while the wheel speed factor is also applied to provide steering compensation at 76. Also applied to the latter are the turn rate (rate of change of heading ) factor $\omega_m$ and a factor representing the wheel base of the cart, from which speed (velocity) compensation factors $V_x$ and $V_y$ are derived for application to table calculator 74.

The north and east wheel speed outputs of 74 are integrated at 77, 78 with position error correction factors from the DGPS/DR calibration, and referenced to initial north and east positions $P_n(0)$ and $P_e(0)$ of the cart, to generate corrected north and east position information $P_n$ and $P_e$, respectively. The meanings attached to the symbols in FIG. 8 and related calculations or computations are described in detail in the '962 application.

Acceleration in the golf cart 50 is computed as described in the '962 application. The accuracy of the acceleration computation is limited by the resolution and noise of the magnetic wheel sensor and heading sensor. The turn rate estimate is particularly affected by systemic errors in the compass output caused by sensor tilt and other uncompensated hard/soft iron (i.e., ferrous metal) effects.

Figure 9:
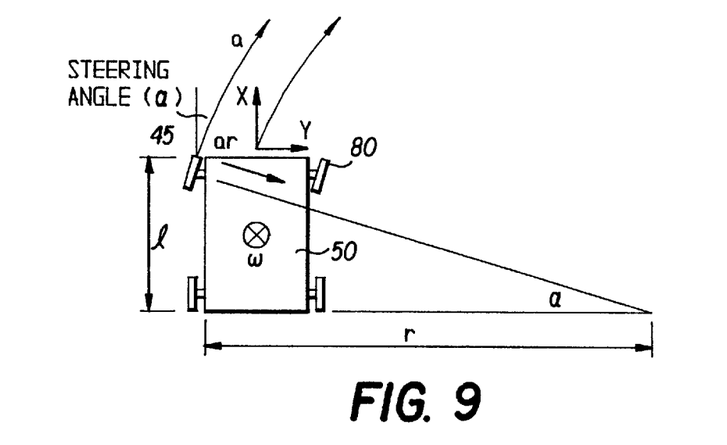
FIG. 9 is a simplified top view of a DR navigation system-equipped golf cart showing the front wheels angled in a turn, useful to explain the embodiment of FIG. 8.

FIG. 9 is a simplified top view of golf cart 50 showing the front wheels 45 (left) and 80 (right) angled in a turn and the various angles and dimensions used in calculations. Steering compensation is achieved as follows. The left front wheel is being used for speed determination, and the direction of the front wheels is not aligned with the body frame of cart 50 in a turn. Turned front wheels induce velocity in both the vehicle x and y axes. The steering angle $\alpha$ is determined from the wheel speed, turn rate, and wheel base. For compass correction, true heading of the vehicle must be computed by the magnetic heading from the compass. Magnetic heading is corrected for the Earth magnetic field declination ($\beta_d$) and for mounting errors on the vehicle and residual hard/soft iron (ferrous material) errors. These mounting and ferrous material errors are estimated by DGPS/DR calibration, essentially by comparing the estimated true heading to the ground track angle computed from DGPS measurement data. A correction to the compass correction table (a lookup table indexed by magnetic heading) is computed based on this heading residual. The error in the table at the current magnetic heading is applied to the magnetic heading to form a corrected true heading.

Figure 10:
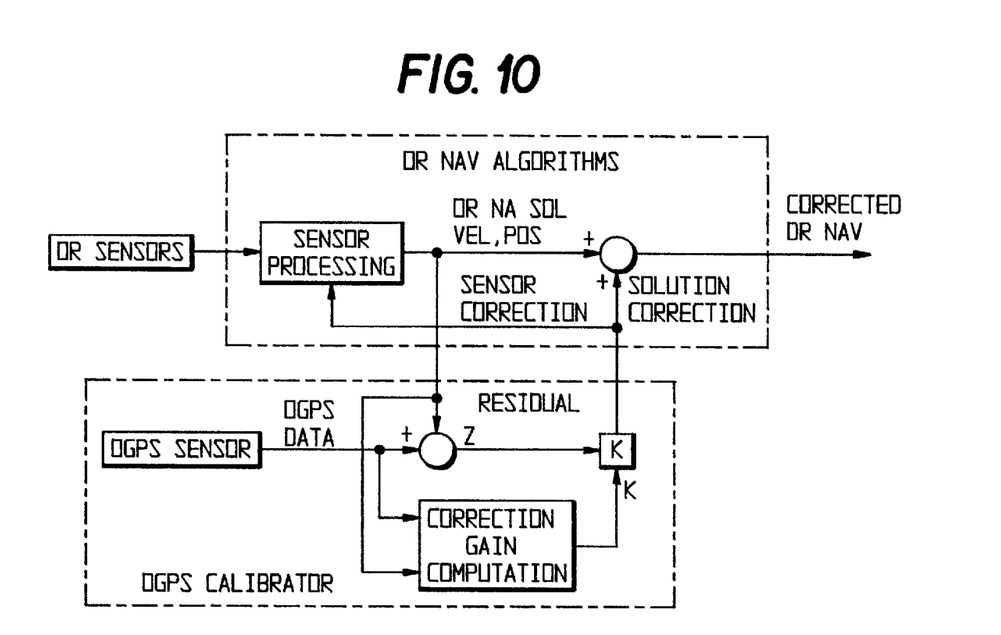
FIG. 10 is a block diagram of the DR calibration.

Implementation of the DGPS/DR calibration is illustrated in the block diagram of FIG. 10. The DR navigation solution is compared to the DGPS data and the errors are then corrected to provide an accurately calibrated DR navigation system. The essence of the correction and calibration technique is the formulation of a correction gain computation and the number of DR sensor errors to be calibrated. The approaches frequently used to provide correction gain computation include ad hoc designs, complementary filter design, and Kalman filter design. Kalman filter usage is the preferred approach, and provides a mathematical formulation to optimally correct (i.e., calibrate) a system with time varying error dynamics such as a DR navigation system, based on the error characteristics of each sensor, sensor errors, and DR navigation errors, and estimates an optimum result from numerous inputs corrupted by noise. The Kalman filter estimates error in the wheel scale factor in contrast to estimating the wheel scale factor itself, by error state propagation as described in the '962 application.

Although a preferred embodiment and method have been described to illustrate the best mode presently contemplated of practicing the invention, it will be apparent to those skilled in the relevant art that variations and modifications may be made without departing from the true spirit and scope of the invention. Accordingly, it is intended that the invention be deemed limited only to the extent required by the appended claims and the rules and principles of the relevant law.

What is claimed is:

1. A system for determining the precise locations of a plurality of golf carts on a golf course in real time as the golf carts are in use during play of the golf course, comprising:
   a base station including apparatus for wireless communication with each of said carts;
   each of said carts having a DC electric motor propulsion system, and each of said carts being outfitted with a dead reckoning navigation (DRN) system and a heading detector to fix the location of the respective cart relative to at least one known feature of the golf course to which the respective DRN system has been calibrated; each said DRN system including a magnetic wheel sensor assembly constructed and adapted for detecting speed and forward-backward direction of the cart and for inhibiting electrical and magnetic fields arising from said motor propulsion system and from other sources external to said magnetic wheel sensor assembly from interference with operation of said magnetic wheel sensor assembly; each of said carts further including apparatus for wireless communication with said base station including communication of data derived from said DPN system and said heading detector indicative of location of the respective cart relative to said at least one known feature; and
   each of said carts having a receiver for receiving differential global positioning system DGPS) signals from earth satellites for re-calibration of the DRN system thereof to said at least one known feature from time to time during each round of play of the golf course, whereby to restore the accuracy of the DRN system upon each re-calibration for relatively accurate determination of real-time location of the respective cart on said golf course.

2. The location determining system of claim 1, wherein said heading detector comprises a floated compass positioned substantially directly above said magnetic wheel sensor assembly on the respective golf cart.

3. The location determining system of claim 2, wherein said floated compass is installed in the roof of the respective golf cart.

4. The location determining system of claim 1, wherein said magnetic sensor assembly comprises a Hall effect sensor and a magnet, wherein said Hall effect sensor is fixed relative to a wheel of the respective golf cart and said magnet is coupled to said wheel for rotation about said Hall effect sensor as said wheel rotates during driving of said golf cart.

5. The location determining system of claim 4, wherein said magnetic sensor assembly further comprises an electrically conductive housing for said Hall effect sensor and connected to said sensor to share the same electrical ground therewith.

6. The location determining system of claim 5, wherein said housing is electrically insulated from the chassis of said golf cart.

7. The location determining system of claim 5, wherein said Hall effect sensor comprises dual Hall effect sensor elements to enable generation of directional signals therefrom indicative of distinguishing movement of said golf cart in forward and backward directions.

8. The location determining system of claim 4, wherein said magnet comprises a magnetic strip with multiple alternating magnetic poles thereon, and said magnetic strip is affixed to a wheel well of said wheel or mounting fixture thereof for passage of said alternating magnetic poles adjacent to said Hall effect sensor as said wheel and said magnetic strip thereon rotates during driving of the respective golf cart about said golf course.

9. The location determining system of claim 8, wherein said Hall effect sensor is positioned to confront said magnetic strip in spaced-apart relation thereto to detect the number of alternating magnetic poles passing by said Hall effect sensor and the direction thereof as said magnetic strip rotates on said wheel during driving of said golf cart.

10. The location determining system of claim 9, wherein said Hall effect sensor is mounted on an axle of said golf cart on which said wheel rotates.

11. The location determining system of claim 10, wherein said Hall effect sensor is mounted above said axle.

12. The location determining system of claim 1, wherein said base station includes display means for observing the locations of said plurality of golf carts from information communicated to said base station by the respective golf carts.

13. Apparatus for installation on a golf cart to calculate the distance from the cart to a golf cup, a hazard, or other feature of a hole of a golf course which has been surveyed so that the location of said golf cup, hazard, or other feature on said hole is known, to enable close approximation of the distance thereto from the lie of a golf ball proximate said cart, said golf cart having access to GPS transmissions solely for calibration of a dead reckoning (DR) navigation system installed on the cart, said apparatus comprising:

a DR wheel sensor assembly for determining speed and direction of said cart relative to a known point of origin of said hole, said assembly including a magnetic strip having a plurality of alternating magnetic poles impressed longitudinally thereon for attachment to a cylindrical wall of a wheel or mounting fixture therefor of said golf cart, and a Hall effect sensor for detecting said alternating magnetic poles during rotation of said wheel when attached in a fixed location on said golf cart in confronting relation to said magnetic strip, to measure speed and forward-backward direction of the golf cart, and further including an electrically conductive housing for said sensor adapted for electrical insulation from the chassis of the golf cart, said housing connected to the sensor to share the same electrical ground therewith, so as to inhibit electrical and magnetic interference with operation of the sensor from the propulsion system of the golf cart or from other sources of electrical or magnetic field.

14. Apparatus according to claim 13, wherein said Hall effect sensor comprises dual Hall effect sensor elements to enable generation of directional signals therefrom indicative of distinguishing movement of said golf cart in forward and backward directions.

15. Apparatus according to claim 13, wherein said access of the cart to GPS transmissions is provided by a GPS receiver for recalibrating the DR navigation system at least once during play of said hole to restore a predetermined level of accuracy to said DR navigation system by substantially removing error buildup arising since the immediately preceding calibration thereof.

16. A golf cart equipped to provide a user of the cart a close approximation of the actual distance from the cart to a golf cup, a hazard, or other feature of known location on a hole of a golf course being played by the cart user, by means of a distance measuring system, a dead reckoning (DR) navigation system, and a OPS receiver for GPS calibration and sporadic re-calibration of said DR system, said distance measuring system, said DR system and said GPS receiver installed on the cart, the DR system comprising a sensor assembly constructed and adapted to determine speed and forward-backward direction of the cart and including portions of said assembly adapted to inhibit electrical and magnetic interference with operation of the sensor of said assembly from the propulsion system of the cart and from other sources of electrical and magnetic fields external to the sensor assembly.

\* \* \* \* \*